United States Patent
Angerer et al.

(10) Patent No.: US 7,577,005 B2
(45) Date of Patent: Aug. 18, 2009

(54) METHOD FOR RECOGNIZING THE LOAD OF AN ISLAND INVERTER AND ISLAND INVERTER

(75) Inventors: Christian Angerer, Sierning (AT); Hannes Heigl, Prambachkirchen (AT); Harald Kreuzer, Linz (AT); Christoph Wolf, Linz (AT)

(73) Assignee: Fronius International GmbH, Pettenbach (AU)

( * ) Notice: Subject to any disclaimer, the term of this patent is extended or adjusted under 35 U.S.C. 154(b) by 243 days.

(21) Appl. No.: 11/792,197

(22) PCT Filed: Dec. 16, 2005

(86) PCT No.: PCT/AT2005/000508

§ 371 (c)(1),
(2), (4) Date: Jun. 1, 2007

(87) PCT Pub. No.: WO2006/063375

PCT Pub. Date: Jun. 22, 2006

(65) Prior Publication Data

US 2008/0130333 A1 Jun. 5, 2008

(30) Foreign Application Priority Data

Dec. 16, 2004 (AT) ............................. A 2109/2004

(51) Int. Cl.
*H02H 7/122* (2006.01)
(52) U.S. Cl. .................. 363/55; 363/98; 307/66
(58) Field of Classification Search .................. 363/37, 363/41, 49, 50, 56.02, 74, 76, 98, 132; 307/31, 307/51, 73, 87, 64, 66; 323/258, 268, 272, 323/285
See application file for complete search history.

(56) References Cited

U.S. PATENT DOCUMENTS 4,453,207 A 6/1984 Paul (Continued)

FOREIGN PATENT DOCUMENTS

JP 07-170678 A 7/1995

(Continued)

OTHER PUBLICATIONS

International Search Report, Oct. 25, 2006.

(Continued)

*Primary Examiner*—Rajnikant B Patel
(74) *Attorney, Agent, or Firm*—Collard & Roe, P.C.

(57) ABSTRACT

The invention relates to a method for recognizing the operational state of a load (10) connected to the output (6, 7) of an island inverter (1). A load recognition signal ($S_L$) is applied at specific moments in time to the output (6, 7) of the island inverter (1), during which specific electric parameters are measured on the island inverter (1), enabling the operational state of the load (10) to be determined, wherein the island inverter (1), when the load (10) is activated, is switched from a possible standby mode into a permanent operation mode and, when the load is deactivated (10), the island inverter is switched from a possible permanent operation mode to a standby mode. The invention also relates to an island inverter (1). In order to ensure reliable recognition of all possible collected loads (10), a load recognition signal ($S_L$) with parameters (T, d, A, H, f) that are modified at least according to the type of load (10) is applied to the output (6, 7) of the island inverter (1).

28 Claims, 4 Drawing Sheets

U.S. PATENT DOCUMENTS

| | | | |
|---|---|---|---|
| 4,847,742 A * | 7/1989 | Ohashi et al. | 363/21.14 |
| 5,327,336 A * | 7/1994 | Ohkubo et al. | 363/97 |
| 5,808,449 A * | 9/1998 | Hirayama et al. | 322/20 |
| 6,172,889 B1 * | 1/2001 | Eguchi et al. | 363/95 |
| 6,750,391 B2 * | 6/2004 | Bower et al. | 136/244 |
| 6,924,993 B2 * | 8/2005 | Stancu et al. | 363/41 |
| 7,015,597 B2 * | 3/2006 | Colby et al. | 307/31 |

FOREIGN PATENT DOCUMENTS

| | | |
|---|---|---|
| JP | 10-136689 A | 5/1998 |
| JP | 2003/223228 | 8/2003 |
| WO | WO 97/43892 | 11/1997 |
| WO | WO 00/79765 | 12/2000 |

OTHER PUBLICATIONS

Fronius Datasheet, "Solarix—autonomous power supply," Feb. 1999, pp. 1-32. XP-002402222 (ISR).

* cited by examiner

METHOD FOR RECOGNIZING THE LOAD OF AN ISLAND INVERTER AND ISLAND INVERTER

CROSS REFERENCE TO RELATED APPLICATIONS

Applicants claim priority under 35 U.S.C. §119 of Austrian Application No. A 2109/2004 filed Dec. 16, 2004. Applicants also claim priority under 35 U.S.C. §365 of PCT/AT2005/000508 filed Dec. 16, 2005. The international application under PCT article 21(2) was not published in English.

The invention relates to a method for recognizing the operational state of a load connected to the output of a stand-alone inverter, wherein a load recognition signal is applied to the output of the stand-alone inverter at predetermined times during which specific electric parameters are measured on the stand-alone inverter to thereby determine the operational state of the load, whereupon, with the load activated, the stand-alone inverter is switched from a possible standby mode to permanent operation and, with the load deactivated, the stand-alone inverter is switched from a possible permanent operation to standby mode.

The invention further relates to a stand-alone inverter including connections for at least one battery or at least one accumulator, connections for at least one load, a DC-AC converter for generating an alternating voltage for the at least one load from the direct voltage of the at least one battery or the at least one accumulator, and a device for recognizing the operational state of the load by applying a load recognition signal to the connections for the load so as to enable the switching of the stand-alone inverter from standby operation to permanent operation, or vice versa, as a function of the operational state of the load.

For the sake of simplicity, reference is in the following only made to a battery for the supply of the required energy. However, the invention equally applies to other energy storages and, in particular, rechargeable accumulators.

Inverters serve to convert the direct voltage of an energy source into an alternating voltage. So-called stand-alone inverters or island inverters produce alternating current from the direct current of a battery so as to enable the operation of ordinary household appliances via batteries even far away from the public power supply. Thanks to stand-alone inverters, the acquisition of relatively expensive or sometimes unavailable appliances as well as expensive low direct voltage lines of, e.g. 12 or 24 V, which are prone to high losses, may be obviated. Instead, the usual devices designed for an alternating voltage of 230 V, such as e.g. tools, television sets, refrigerators, electric motors etc., can be used. Such stand-alone inverters are, for instance, used for camping, on ships or in remote places without 230-Volt alternating voltage supply.

In order to optimally utilize the available battery resources, the stand-alone inverter is switched to what is called standby operation, if no consumer or no load is activated. Since the stand-alone inverter in such a standby operation mode takes up substantially less energy, usually about a tenth of the energy taken up during permanent operation, the battery life will be substantially increased and, hence, the interval in which the batteries have to be renewed or recharged will be substantially extended. In the permanent operation mode, the stand-alone inverter feeds the connected loads continuously with alternating voltage.

In addition, a further mode of operation may be provided, in which the stand-alone inverter is completely turned off. This is, for instance, conceivable for those periods during which the camping bus, the ship or the weekend apartment is not occupied and no electric current is required.

If a load is activated during the standby operation of the stand-alone inverter, the stand-alone inverter must be switched to permanent operation as rapidly as possible in order to safeguard the supply of electric energy to the load. To this end, load recognition methods are known, in which load recognition signals are applied to the output of the stand-alone inverter at predetermined times while specific electric parameters, in particular the delivered current or the voltage change occurring at the connections of the battery of the stand-alone inverter, are measured to determine the operational state of the load. If an activated load is recognized, the stand-alone inverter will be switched to permanent operation so as to ensure the supply of the load with the alternating voltage delivered by the stand-alone inverter. The load recognition signal, as a rule, is a signal having a specific, constant amplitude and comprised of several periods of a sinusoidal voltage.

WO 00/79675 A1, for instance, describes a method for recognizing a load capable of being connected to an inverter on demand as well as the respective load recognition system, which is characterized in that the recognition of the load is enabled without additional expenditures required for a galvanic separation.

Other load recognition systems generating load recognition signals are, for instance, known from JP 10136689 A, JP 2003 223228 A and WO 1997/43892 A2.

In order to enable rapid responses to changing operational states of connected loads, load recognition signals must be emitted at relatively short intervals of, for instance, 0.5 s. A deactivation of the load is likewise recognized by the load recognition, whereupon the stand-alone inverter may again be switched to standby operation with reduced energy consumption.

The known load recognition methods involve the disadvantage that loads with particularly low power inputs, such as e.g. energy saving lamps as well as special consumers like, e.g., refrigerators with their own electronics, are hardly or not at all recognized. The presence of such loads, thus, renders the switching of the stand-alone inverter to standby operation impossible, since no changeover of the stand-alone inverter to permanent operation would occur in the event of an activation of the energy saving lamp or the refrigerator. If the stand-alone inverter is not operated in the standby mode, this will, in turn, lead to a shorter service life of the connected battery and/or shorter intervals between the necessary charging cycles for the battery on the input of the stand-alone inverter. Nor do the conventional load recognition methods function with electronic consumers including turn-on delays, such as, e.g., luminescent tubes or other electronically controlled appliances.

To adapt the load recognition to unforeseeable parameters and to the age and type of the battery as well as the lengths and cross sections of charging lines, it is known to perform a calibration of the load recognition. In doing so, the amplitude of the load recognition signal is adapted to the respective conditions. The stand-alone inverter with the type designation "Solarix", for instance, offers such a calibration procedure for the load recognition.

The known load recognition methods involve the disadvantage of using fixedly pregiven load recognition signals for recognizing loads or consumers, for which reason the strongly varying loads would frequently not be recognized correctly. In those cases, the stand-alone inverter would be switched to permanent operation either not at all or with a long delay. The user is, thus, forced to constantly use the stand-alone inverter in the permanent operation mode in order to ensure the safe operation of their loads, which is why an elevated energy demand will be required even if no energy is consumed by the loads. The stand-alone inverter requires substantially more energy in the permanent operation mode than in the standby mode, in which only periodic load-recognition signals are emitted. The stand-alone inverter consequently must draw this necessary energy from the connected battery, which will result in a substantially reduced service life.

The object of the present invention resides in providing an above-mentioned load-recognition method which enables the recognition of the operational states of all kinds of loads with high reliability. The stand-alone inverter is to be operable in the standby mode even with loads that have not been recognized by previous methods, in order to lower the energy consumption of the stand-alone inverter and substantially increase the service life of the energy source. Drawbacks of known load recognition methods are to be avoided or reduced.

Another object of the present invention consists in providing an above-mentioned stand-alone inverter including a device for recognizing the operational states of connected loads, which will most reliably recognize all kinds of loads so as to allow operation in the standby mode with all kinds of loads, since a changeover to permanent operation will automatically be effected upon recognition of the loads. The stand-alone inverter is to be constructed in a manner as simple and cost-effective as possible.

The first object of the invention is achieved in that a load-recognition signal with at least one parameter changed as a function of the type of load is applied to the output of the stand-alone inverter. The load recognition method according to the invention, thus, optimally adapts the load recognition signal to the respective load so as to enable the safe recognition of the operational state of the load and a rapid changeover from standby mode to permanent operation and vice versa. This measure enables the stand-alone inverter to be switched to standby operation even with loads that have not been reliably recognized so far, thus substantially reducing its energy consumption. As a result, a longer battery life and a larger cycle for the replacement of the battery or the realization of the charging cycles will be achieved. Depending on the type of load, at least one parameter of the load recognition signal is accordingly changed so as to ensure a highly reliable load recognition. This will even enable the reliable recognition of consumers with low-energy inputs, such as, e.g., energy-saving lamps or consumers with electronic switching facilities like, e.g., cooling devices. Where several loads are connected, what is usually the case, the load recognition signal is dimensioned for that load which is the most difficult to recognize and/or which has to be activated with the shortest delay possible by switching the stand-alone inverter to permanent operation.

According to a characteristic feature of the invention, the repetition rate of the load recognition signal is changed as a function of the type of load. For some loads, it is necessary to carry out the recognition at very short intervals so as to enable a safe activation of the load. For other loads, the repetition rate of the load recognition signal may not be regarded that critical, which is why higher repetition rates may be chosen.

The repetition rates may, for instance, range between some milliseconds and several hours, depending on the type of load. The repetition rate can also be adapted to the user's requirements.

Alternatively or additionally to the repetition rate, also the signal duration of the load recognition signal may be changed as a function of the type of load. In this manner, even special consumers like, e.g., refrigerators including their own electronics will be safely recognized, such appliances with their own electronic circuits usually comprising delayed current inputs.

Alternatively or additionally to the above-mentioned parameters, also the amplitude of the load recognition signal may be changed as a function of the type of load. A load recognition signal amplitude adapted to the load and as small as possible will again enable the saving of energy in the standby operation.

Alternatively or additionally to the above-mentioned parameters, also the envelope shape of the load recognition signal may be changed as a function of the type of load. A suitable selection of the envelope allows for the safe switching on of special loads, such as e.g. motors and capacitive consumers, without overcurrent.

According to a further characteristic feature of the invention, it is further provided that the frequency of the load recognition signal is changed as a function of the type of load. This, too, enables the adaptation of the load recognition signal to special types of load so as to enable the safe recognition of the load.

The pulse duration of the load recognition pulse may also be changed by selecting the number of periods at the pregiven frequency as a function of the type of load. The pulse duration is, thus, selected, and accordingly adjusted, by the number of periods of the frequency of the load recognition signal rather than by absolute time values.

According to a further characteristic feature of the invention, at least one of the mentioned parameters of the load recognition pulse is adjusted as a function of the type of load. By using suitable written material, the user may, for instance, select that load to which they want the load recognition signal to be adapted, in order to receive a proposal for the adjustment of at least one parameter to be subsequently effected on the pulse inverter.

Alternatively, already defined load recognition signals or their parameters can be stored for different types of loads so as to enable the user to select therefrom the desired load recognition signal or its parameter, whereupon the selected load recognition signal, or the load recognition signal with the selected parameters, will be applied to the output of the stand-alone inverter. This constitutes an enhanced user-friendliness, since the user need not adjust the respective parameters of the load recognition signal but merely select one of the already preadjusted load recognition signals or parameters.

According to a further characteristic feature of the invention, it is provided that, with the load activated, that load recognition signal or parameter which enables the quickest recognition of the activated operational state of the load is automatically selected from the stored load recognition signals or their stored parameters. In this manner, the automatic optimization of the stand-alone inverter to the respective, connected load may take place. In practice, the user will only turn on that load to which they want the stand-alone inverter to be optimized, and start a program on the stand-alone inverter, which will automatically try all variants of load recognition signals or their parameters one after the other so as to select therefrom the optimum load recognition signal to be used in future for the load recognition.

According to a further characteristic feature of the invention, it is provided that, with the load activated, at least one parameter of the load recognition pulse applied to the output of the stand-alone inverter is varied until the activated operational state of the load is recognized, and the at least one parameter is subsequently stored. In this manner, the optimum load recognition signal for the connected load can be selected without any stored load recognition signals being available.

In this case, the at least one parameter of the load recognition pulse is preferably automatically varied until the activated operational state of the load is recognized, and the at least one parameter is subsequently automatically stored. In doing so, the user activates the respective load starting a program on the stand-alone inverter, whereupon the selected parameter, for instance the pulse duration, is optimally adapted to the connected load. The automatically detected optimum pulse duration will then be stored and define the employed load recognition signals.

Advantageously, together with the load recognition signals stored as a function of the types of loads, also information on the loads, such as e.g. the type or product number or manufacturer of a load, is stored. In this manner, the user will be offered in a particularly simple manner the different types of loads, for instance on a display provided on the stand-alone inverter, whereupon, after the selection of the respective load, for instance the refrigerator of a specific manufacturer with a specific type designation, the associated optimized load recognition signal will be selected and taken as a basis for the load recognition.

The second object of the invention is achieved by a stand-alone inverter as indicated above, wherein a device for changing at least one parameter of the load recognition signal as a function of different types of loads is provided. By the use of an optimized load recognition signal adapted to the type of load or consumer, the safe switching of the stand-alone inverter from standby operation to permanent operation will be feasible, and energy will by saved by the standby operation so as to increase the service lives of the energy sources, in particular batteries or accumulators.

In this respect, means for changing the repetition rate, the signal duration, the amplitude, the envelope shape or the frequency may be provided alone or in combination.

These means for changing or selecting at least one parameter of the load recognition signal in a simple manner may be comprised of a switch or push-button.

It is likewise possible that a device for changing or selecting at least one parameter of the load recognition signal is comprised of a display and at least one operating element to facilitate the adjustability for the user. The user may, for instance, scroll through different load recognition signals or parameters and select the desired load recognition signal, or the desired parameter, by actuating the operating element.

According to a further characteristic feature of the invention, a device for changing or selecting at least one parameter of the load recognition signal is comprised of a remote control. The selection of the desired load recognition signal will, thus, be even further facilitated. The term remote control is to be understood in its widest sense so as to encompass both remote controls of the type used with TV sets, but also appliances that enable operation from larger distances. The user is, thus, able to effect, for instance, an adjustment of the stand-alone inverter from larger distances via high-frequency signals.

According to a further characteristic feature of the invention, at least one memory for storing load recognition signals, or their parameters, for different types of loads is provided. It enables the storage of the most diverse load recognition signals for the most diverse types of loads in the memory of the stand-alone inverter, which will be selected by the user merely by appropriate definitions. The user is, thus, released from the work involved in the setting of the parameters of the load recognition signals.

Furthermore, a device for automatically changing or selecting at least one parameter of the load recognition signal, with the load activated, until the recognition of the activated operational state of the load and a memory for storing the load recognition signal upon recognition of the activated operational state of the load may be provided. By such a device for automatically changing or selecting at least one parameter of the load recognition signal, the stand-alone inverter releases the user from the work involved in the manual change of a parameter of the load recognition signal until finding the optimum load recognition signals for special loads. In practice, the user will, for instance, select a parameter, activate the load and subsequently start a program on the stand-alone inverter, which will sample the different parameter values and find the optimum parameter to subsequently store it in the memory, said parameter having thus been fixed for the load recognition signals used.

Furthermore, a device for automatically selecting, from the stored load recognition signals, that load recognition signal by which the operational state of the activated load is recognized the fastest may be provided. The stand-alone inverter will, thus, automatically find the optimum load recognition signal for the respective load according to a specific algorithm.

In addition, the stand-alone inverter may be provided with connections for an external energy source, e.g. a solar module. Charging of the batteries or accumulators is, thus, feasible via such external energy sources, e.g. the solar module, and the service life of the autonomous energy supply will, thus, be enhanced even further.

The present invention will be explained in more detail with reference to the accompanying drawings. Therein:

Figure 1:
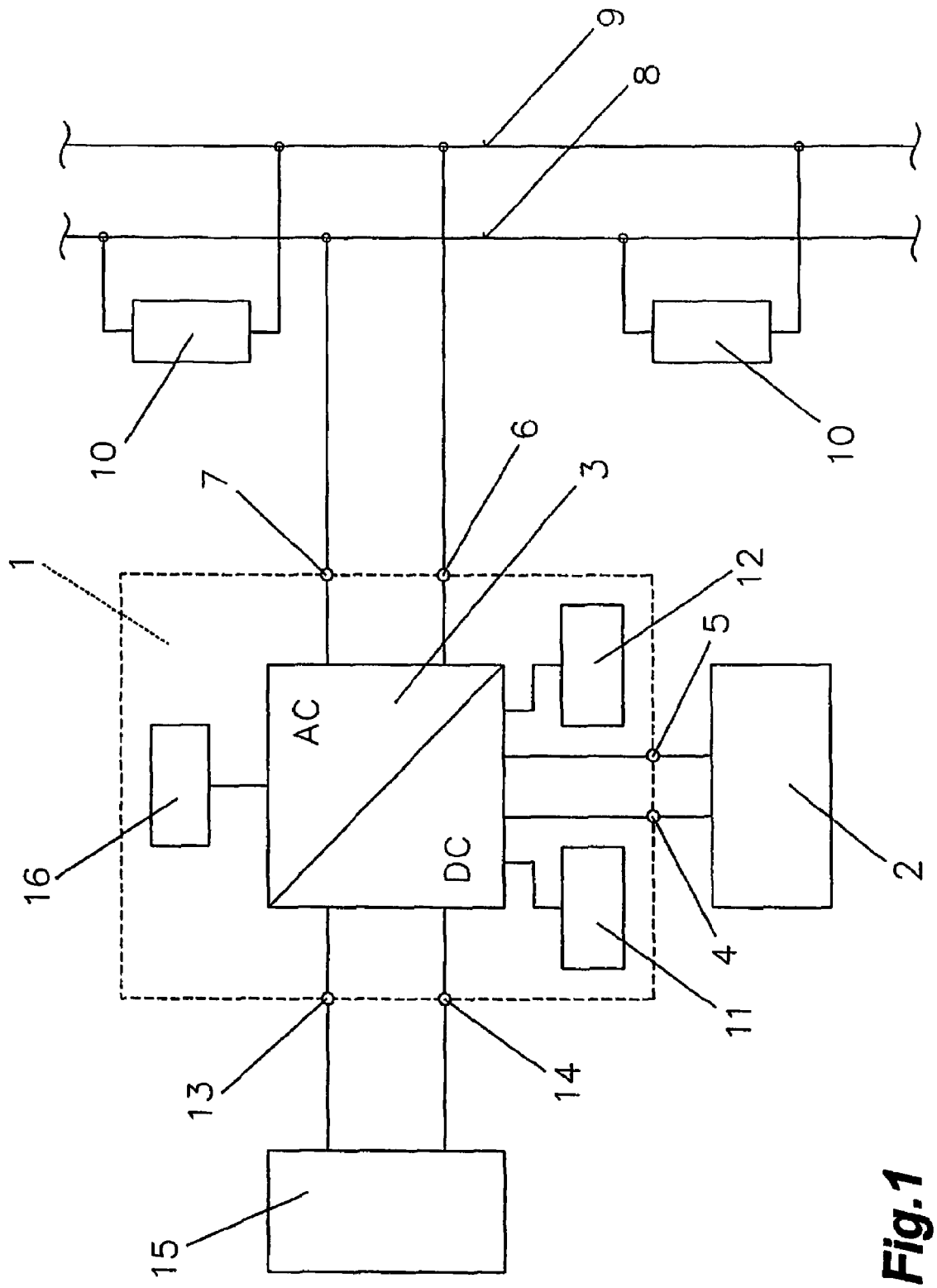
FIG. 1 is a block diagram of a stand-alone inverter.

FIG. 1 is a block diagram of a stand-alone inverter 1 which, by the aid of a DC/AC module 3, delivers an alternating voltage of usually 230 Volt from a direct voltage fed by a battery 2 or an accumulator. The at least one battery 2 is connected to the stand-alone inverter 1 via appropriate connections 4, 5. The alternating voltage produced is delivered to loads 10 via connections 6, 7 and appropriate lines 8, 9. The stand-alone inverter 1 can be further equipped with a control device 11 and an input/output unit 12. In addition, external energy sources 15 such as, e.g., a solar module may be connected via further connections 13, 14, which serve to supply the loads 10 with energy or to charge the battery 2 with power. If the stand-alone inverter 1 were constantly run in the permanent mode, its components would permanently require electric energy, which would be obtained from the battery 2. Accordingly, the battery 2 would be emptied by the stand-alone inverter 1 and, hence, its service life be reduced even if the loads 10 were out of operation and, for instance, no or only a small amount of energy were fed via the energy source 15. To this end, the stand-alone inverter 1 usually comprises a so-called standby mode, in which a substantially reduced energy consumption is required. In order for the stand-alone inverter 1 to recognize the turning on of a load 10 in the standby mode, the turning on of the load 10 must be recognized at periodic time intervals. This is effected by a device 16 for generating a load recognition signal $S_L$, which is emitted to the loads 10 via the connections 6, 7. At the same time, the delivered power, or the voltage change, is detected on the direct voltage side of the DC/AC module 3 of the stand-alone inverter 1, whereby the activation of a load 10 will be recognized. If such a load 10 is recognized, the stand-alone inverter 1 will be switched from standby to permanent operation in order to feed the respective load 10 with alternating voltage. In doing so, a load recognition signal $S_L$ comprised of some periods of a sinusoidal alternating voltage is usually employed. Different electronics-based loads 10, e.g. cooling devices, would not be reliably recognized by such a load recognition signal $S_L$, which would result in no changeover of the stand-alone inverter 1 to permanent operation and, hence, no supply of the load 10 with the necessary alternating voltage. As a result, the user would constantly run the stand-alone inverter 1 in the permanent operation mode and take into account an elevated energy demand, thus reducing the service life and supply period of the battery 2.

Figure 2:
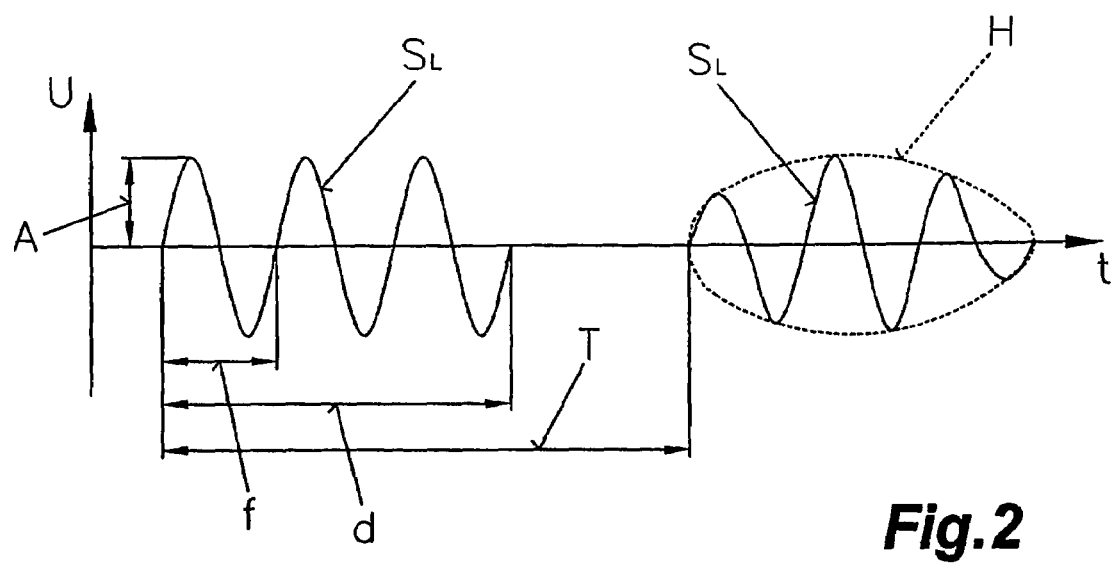
FIG. 2 depicts the time curves of two load recognition signals to illustrate the different parameters of the load recognition signals.

FIG. 2 illustrates the time curves of different load recognition signals $S_L$ and their parameters. The load recognition signal $S_L$ in the left-hand part of the time diagram comprises three periods of a sinusoidal alternating voltage having a frequency f or period 1/f and an amplitude A. The duration d of the load recognition signal $S_L$ in the illustrated example is three times the period 1/f of the sinusoidal alternating voltage. The load recognition signals $S_L$ are repeated in pregiven time intervals T. This repetition rate T may, for instance, range between some milliseconds and several hours. The load recognition signal $S_L$ illustrated in the time diagram on the right-hand side has a specific shape of its envelope H, which may likewise serve to safely recognize loads 10. The following parameters of the load recognition signals $S_L$ may, thus, be varied:

Repetition rate T
Pulse duration d
Amplitude A
Envelope shape H
Frequency f

The parameters T, d, A, H and f can be adapted to the respective load 10 and accordingly modified either manually by the user or automatically by the stand-alone inverter 1. The load recognition pulse $S_L$ is, thus, optimally adapted to the load 10 to thereby ensure the reliable recognition of the load 10 so as to enable the stand-alone inverter 1 to be operated in the standby mode basically with all loads 10 and, hence, save energy. By selecting very long repetition rates T and small amplitudes A, an energy-saving operation of the stand-alone inverter 1 is achieved even in the standby mode. By contrast, very small repetition rates T will cause rapid responses to turned-on loads 10 and the practically delay-free activation of the latter by a changeover of the stand-alone inverter 1 to permanent operation.

By selecting an extended pulse duration d, the reliable recognition of loads 10 with a delayed current input, for instance of electronics-based cooling devices, will be achieved. The electronics of usual cooling devices must be supplied with energy for a certain period of time until the compressor is finally activated, in order to enable the safe activation of the cooling device by an adaptation of the pulse duration d. An elevated pulse duration d will, thus, also ensure the safe recognition and turning on of the load 10. By appropriately selecting the envelope H, the safe starting of motors or the switching-on of capacitive consumers will be feasible without overcurrent.

Figure 3:
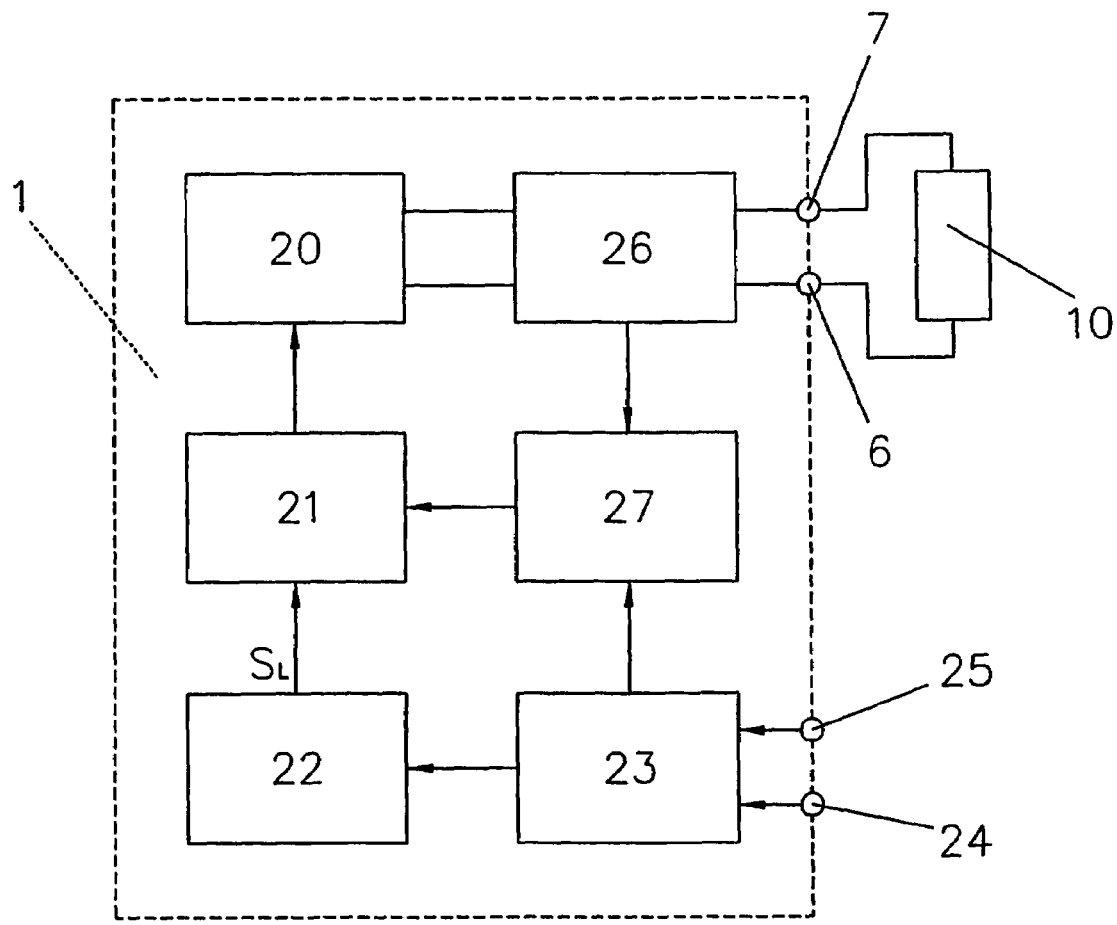
FIG. 3 is a block diagram of an embodiment of a stand-alone inverter comprising the load recognition according to the invention.

FIG. 3 depicts a block diagram of an embodiment of a stand-alone inverter 1 comprising the load recognition according to the invention. The stand-alone inverter 1 includes an output bridge 20, which is connected with the at least one load 10 via connections 6, 7. The output bridge 20 delivers the alternating voltage required for the load 10. The module 21 serves to control the output bridge 20. A device 22 for generating a load recognition signal $S_L$ is connected with the output bridge control circuit 21. The parameters required for the generation of the load recognition signal $S_L$ are stored in a memory 23. The parameters can be fixed and selected either manually via appropriate operating elements 24 or automatically by the activation of an appropriate software via line 25. The load recognition signal $S_L$ is applied to the load 10 via the output bridge 20. In a signal detection device 26, the output current and/or the output voltage at the connections 6, 7 of the stand-alone inverter 1 are measured, and a respective control circuit 27 will be activated upon recognition of an activated load 10. The control circuit 27, via the output bride control circuit 21, causes a changeover of the stand-alone inverter from standby operation to permanent operation, or a changeover back to standby operation upon recognition of the deactivation of the load 10.

Figure 4:
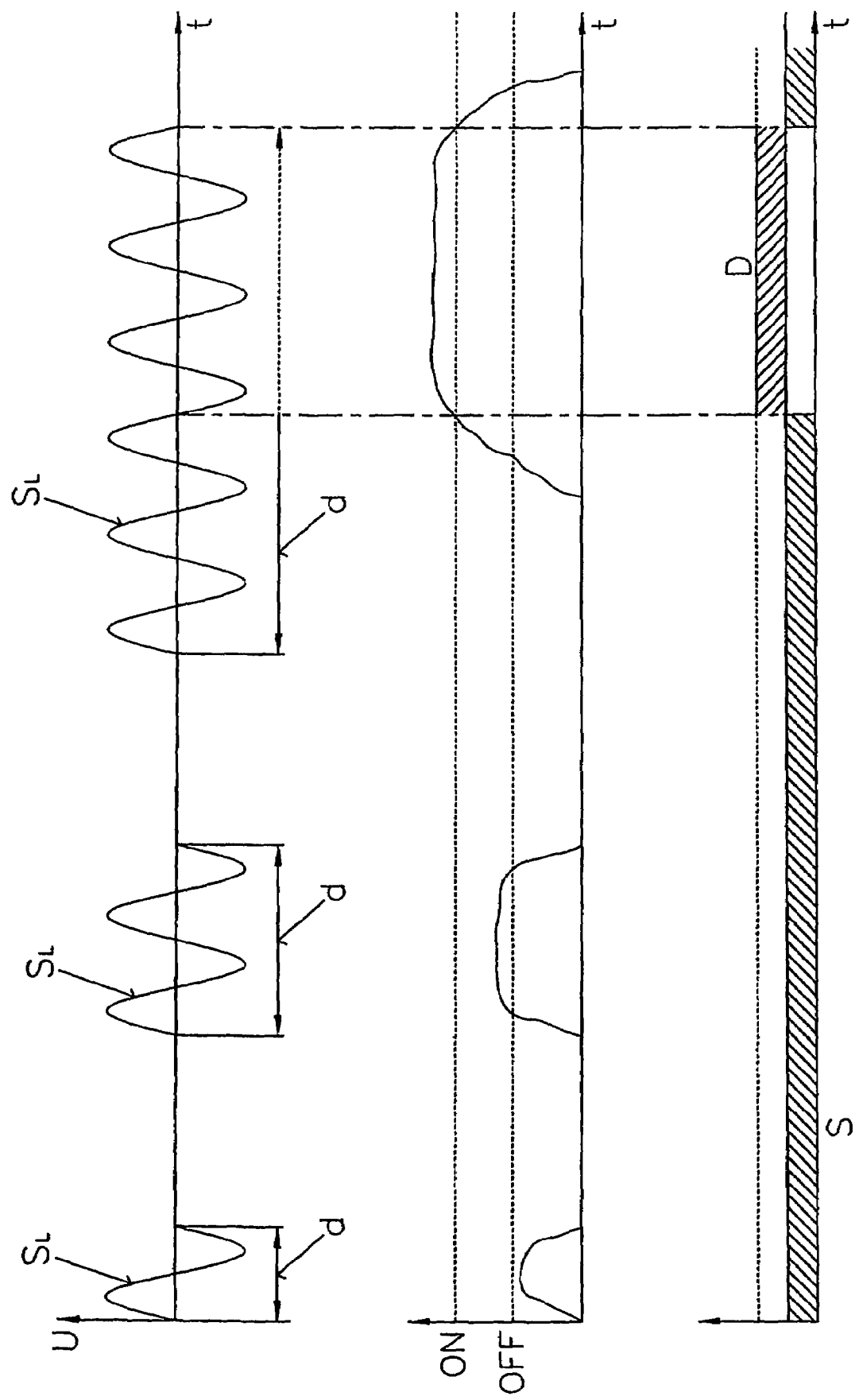
FIG. 4 depicts diagrams resulting from the application of a load recognition method according to the invention.

FIG. 4 shows the time curves of an example of an automatic load recognition according to the invention, exemplified by a load 10. In the case of the first two load recognition signals $S_L$, the signal response detected by the signal detection circuit 26 is too weak to recognize an activation of the load 10. It is only with a sufficiently long load recognition signal $S_L$ that the activation of the load 10 will be reliably recognized, whereupon the stand-alone inverter will be switched to permanent operation D. If the signal response remains under a specific level, the deactivation of the load 10 will be recognized and the stand-alone inverter 1 will again be switched to the standby mode S. By varying the parameter of the signal duration d of the load recognition signal, a reliable recognition of the load is, thus, reached.

By the solution according to the invention, this is achieved in that the stand-alone inverter 1 is, for instance, set to automatic load recognition with a varying signal duration d as, for instance, illustrated in FIG. 4. In this case, the stand-alone inverter 1 starts to emit a load recognition signal $S_L$ with the smallest signal duration d possible. If no load 10 is recognized by the signal detection circuit 26, the signal duration d will be increased by a predefined value and a new load recognition signal $S_L$ will be emitted. This is repeated by the stand-alone inverter 1 until a recognition of the load 10 occurs, whereupon a direct changeover to permanent operation D will be effected. The changeover of the load recognition signal $S_L$ to permanent operation D is visible in the third load recognition signal $S_L$ by different types of lines, the load recognition phase being illustrated in full lines and the permanent operation D being shown by broken lines.

It is now, for instance, possible that the stand-alone inverter 1 stores in the memory 23 the last-emitted load recognition signal $S_L$, by which the load 10 was recognized, and uses the same for a new load recognition from the standby operation S. It is, of course, also possible to constantly effect a continuous change of the load recognition signal $S_L$, which means that the stand-alone inverter 1 in the standby mode S will always start with the smallest load recognition signal $S_L$ and change the same until recognizing the load 10. In doing so, the user may, however, preset in the stand-alone inverter 1 which of the parameters like, in particular, the repetition rate T, the pulse duration d, the amplitude A, the shape of the envelope H, the frequency f of the load recognition signal $S_L$ is to be changed. It is, moreover, possible to set or program the stand-alone inverter 1 so as to change several parameters one by one or simultaneously.

Figure 5:
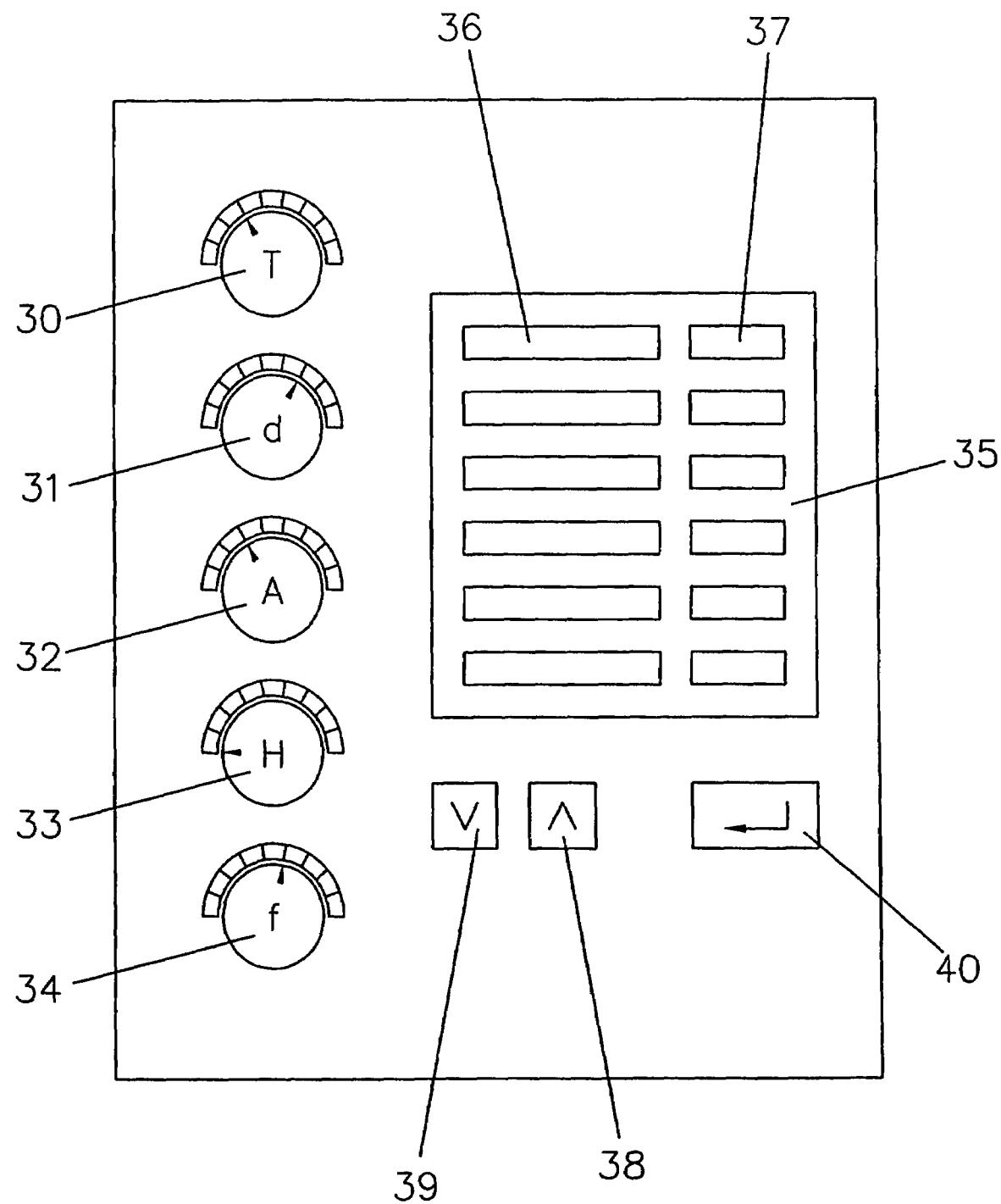
FIG. 5 illustrates an example for the operating unit of a stand-alone inverter according to the invention.

FIG. 5 finally illustrates an example of an operating unit of a stand-alone inverter according to the invention, which is comprised of means 30, 31, 32, 33 and 34 for changing or selecting the repetition rate T, the signal duration d, the amplitude A, the shape of the envelope H, and the frequency f, of the load recognition signal $S_L$.

Additionally or alternatively, also a display 35 may be provided, on which different stored load recognition signals $S_L$ are offered in the form of texts, information or signal representations 36. Furthermore, additional information 37 on the respective load 10 to which the respective load recognition signal $S_L$ is adapted, e.g. product information or the like, can be represented on the display 35 so as to enable the user to directly select their load 10, i.e. their product, by the type designation, whereupon a matching load recognition signal $S_L$ will be adjusted. Actuation elements 38, 39, 40 enable the simple selection of the desired load recognition signal $S_L$ for the respective load 10 by the user. The adjustment of the stand-alone inverter 1 can also be made via a remote control (not illustrated).

Furthermore, it is possible for the user to manually input their own designation of one or several loads 10 while storing the associated load recognition signal $S_L$ or have an automatic load recognition carried out in each case, with the subsequent storage of the load recognition signal $S_L$ assigned to said designation. The user may, thus, for instance, assign their own designation, and provide or determine the optimum load recognition signal $S_L$, for special combinations of loads 10.

The invention claimed is:

1. A method for recognizing the operational state of a load (10) connected to the output (6, 7) of a stand-alone inverter (1), wherein a load recognition signal ($S_L$) is applied to the output (6, 7) of the stand-alone inverter (1) at predetermined times during which specific electric parameters are measured on the stand-alone inverter (1) to thereby determine the operational state of the load (10), whereupon, with the load (10) activated, the stand-alone inverter is switched from a possible standby mode to permanent operation and, with the load (10) deactivated, the stand-alone inverter is switched from a possible permanent operation to standby mode, wherein a load-recognition signal ($S_L$) with at least one parameter (T, d, A, H, f) changed as a function of the type of load (10) is applied to the output (6, 7) of the stand-alone inverter (1).

2. A load recognition method according to claim 1, wherein the repetition rate (T) of the load recognition signal ($S_L$) is changed as a function of the type of load (10).

3. A load recognition method according to claim 2, wherein the repetition rate (T) is changed between some milliseconds and several hours as a function of the type of load (10).

4. A load recognition method according to claim 1, wherein the signal duration (d) of the load recognition signal ($S_L$) is changed as a function of the type of load (10).

5. A load recognition method according to claim 1, wherein the amplitude (A) of the load recognition signal ($S_L$) is changed as a function of the type of load (10).

6. A load recognition method according to claim 1, wherein the envelope shape (H) of the load recognition signal ($S_L$) is changed as a function of the type of load (10).

7. A load recognition method according to claim 1, wherein the frequency (f) of the load recognition signal ($S_L$) is changed as a function of the type of load (10).

8. A load recognition method according to claim 4, wherein the pulse duration (d) of the load recognition pulse ($S_L$) is changed by selecting the number of periods with the pregiven frequency (f) as a function of the type of load (10).

9. A load recognition method according to claim 1, wherein at least one parameter (T, d, A, H, f) of the load recognition pulse ($S_L$) is manually (30-34) adjusted as a function of the type of load (10).

10. A load recognition method according to claim 1, wherein the load recognition signal ($S_L$) applied to the output (6, 7) of the stand-alone inverter (1), or its parameter (T, d, A, H, f), is selected from several load recognition signals ($S_L$), or their parameters (T, d, A, H, f), defined and stored for different types of loads (10).

11. A load recognition method according to claim 10, wherein, with the load (10) activated, that load recognition signal ($S_L$) or parameter (T, d, A, H, f) which enables the quickest recognition of the activated operational state of the load (10) is automatically selected from the stored load recognition signals ($S_L$) or their stored parameters (T, d, A, H, f).

12. A load recognition method according to claim 1, wherein with the load (10) activated, at least one parameter (T, d, A, H, f) of the load recognition pulse ($S_L$) applied to the output (6, 7) of the stand-alone inverter (1) is varied until the activated operational state of the load (10) is recognized, and the at least one parameter (T, d, A, H, f) is subsequently stored.

13. A load recognition method according to claim 12, wherein the at least one parameter (T, d, A, H, f) of the load recognition pulse ($S_L$) is automatically varied until the activated operational state of the load (10) is recognized, and the at least one parameter (T, d, A, H, f) is subsequently automatically stored.

14. A load recognition method according to claim 10, wherein together with the load recognition signals ($S_L$) stored as a function of the types of loads (10), also information on the loads (10) is stored.

15. A stand-alone inverter (1) including connections (4, 5) for at least one battery (2) or at least one accumulator, connections (6, 7) for at least one load (10), a DC-AC converter (3) for generating an alternating voltage (AC) for the at least one load (10) from the direct voltage (DC) of the at least one battery (2) or the at least one accumulator, and a device for recognizing the operational state of the load (10) by applying a load recognition signal ($S_L$) to the connections (6, 7) for the load so as to enable the switching of the stand-alone inverter (1) from standby operation to permanent operation, or vice versa, as a function of the operational state of the load (10), wherein a device for changing or selecting at least one parameter (T, d, A, H, f) of the load recognition signal ($S_L$) as a function of different types of loads (10) is provided.

16. A stand-alone inverter (1) according to claim 15, wherein a means (30) for changing or selecting the repetition rate (T) of the load recognition signal ($S_L$) is provided.

17. A stand-alone inverter (1) according to claim 15, wherein a means (31) for changing or selecting the signal duration (d) of the load recognition signal ($S_L$) is provided.

18. A stand-alone inverter (1) according to claim 15, wherein a means (32) for changing or selecting the amplitude (A) of the load recognition signal ($S_L$) is provided.

19. A stand-alone inverter (1) according to claim 15, wherein a means (33) for changing or selecting the envelope shape (H) of the load recognition signal ($S_L$) is provided.

20. A stand-alone inverter (1) according to claim 15, wherein a means (34) for changing or selecting the frequency (f) of the load recognition signal ($S_L$) is provided.

21. A stand-alone inverter (1) according to claim 15, wherein a means for changing or selecting the at least one parameter (T, d, A, H, f) of the load recognition signal ($S_L$) is comprised of a switch.

22. A stand-alone inverter (1) according to claim 15, wherein a means for changing or selecting at least one parameter (T, d, A, H, f) of the load recognition signal ($S_L$) is comprised of a display (35) and at least one operating element (38, 39, 40).

23. A stand-alone inverter (1) according to claim 15, wherein a means for changing or selecting at least one parameter (T, d, A, H, f) of the load recognition signal ($S_L$) is comprised of a remote control.

24. A stand-alone inverter (1) according to claim 15, wherein at least one memory (23) for storing the load recognition signals ($S_L$), or their parameters (T, d, A, H, f), for different types of loads (10) is provided.

25. A stand-alone inverter (1) according to claim 24, wherein at least one memory (23) for storing information on the different types of loads (10) is provided.

26. A stand-alone inverter (1) according to claim 15, wherein a device for automatically changing or selecting at least one parameter (T, d, A, H, f) of the load recognition signal ($S_L$), with the load activated, until the recognition of the activated operational state of the load (10) and a memory (23) for storing the parameters (T, d, A, H, f) of the load recognition signal ($S_L$) upon recognition of the activated operational state of the load (10) are provided.

27. A stand-alone inverter (1) according to claim 24, wherein a device for automatically selecting, from the stored load recognition signals ($S_L$), that load recognition signal ($S_L$) by which the operational state of the activated load (10) is recognized the fastest is provided.

28. A stand-alone inverter (1) according to claim 15, wherein connections (13,14) for an external energy source (15), e.g. a solar module, are provided.

* * * * *